Aug. 23, 1927.
J. L. FLORI
1,639,690
PISTON RING COMPRESSOR
Filed Sept. 2. 1924
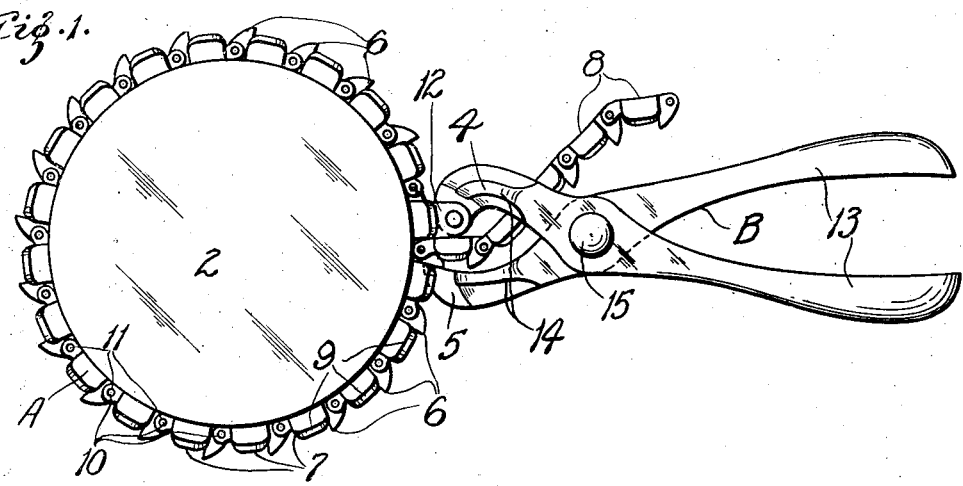
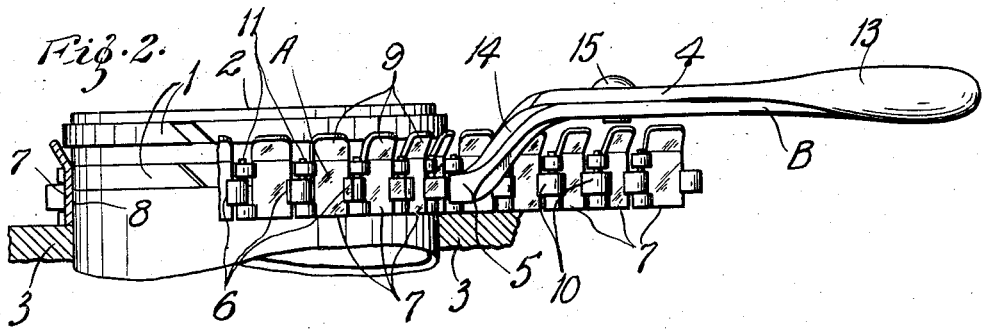
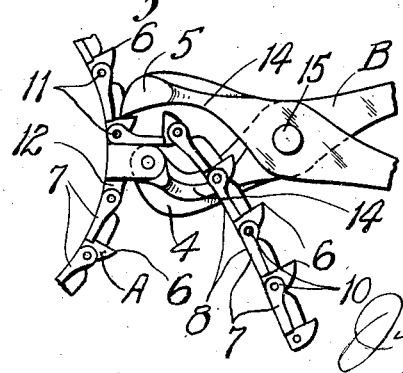
Inventor:
Jules L. Flori
by his Attorneys.

Patented Aug. 23, 1927.

1,639,690

UNITED STATES PATENT OFFICE.

JULES L. FLORI, OF ST. LOUIS, MISSOURI, ASSIGNOR OF ONE-FOURTH TO WILLIAM HURDLEBRING, JR., AND THREE-FOURTHS TO HENRY R. FUERBORN, BOTH OF ST. LOUIS, MISSOURI.

PISTON-RING COMPRESSOR.

Application filed September 2, 1924. Serial No. 735,339.

My invention relates to piston ring compressors that are adapted for contracting the spring metal rings of pistons and the like in their retaining grooves so as to bring the surfaces of the rings flush with the surface of the piston and permit the piston and rings to be inserted in a cylinder; and the invention has for its principal object a tool by which the operation of inserting a piston in a cylinder may be easily and quickly performed.

The invention consists principally in a band or chain provided with a multiplicity of projections and a pair of operating levers, the end of one of said levers being secured to the chain and the end of the other lever being adapted to cooperate with one of said projections on the chain to contract the chain around a piston. The invention further consists in the piston ring compressor and in the parts and combinations of parts hereinafter described and claimed.

In the accompanying drawing, which forms part of this specification and wherein like reference characters indicate like parts wherever they occur, Fig. 1 is a top plan view of a piston ring compressor embodying my invention, the compressor being shown in position around the ring of a piston;

Fig. 2 is an elevation, a portion of the chain being broken away so that the position of a link with respect to the piston ring may be shown; and Fig. 3 is a fragmentary bottom plan view showing the means for contracting the chain.

A band or chain A that is adapted to encircle the rings 1 of a piston 2 of an automobile cylinder 3 or the like is secured to the end of one lever 4 of a pair of pivotally connected clamping levers B. The end portion of the other clamping lever 5 is adapted to engage one of a multiplicity of projections 6 on said chain whereby by drawing together said clamping levers, the chain will be drawn tightly around a piston ring 1.

In the form shown in the drawings, the chain A is composed of a multiplicity of links 7 that are preferably made of comparatively soft metal that will not score or injure the metal of the piston and rings. The surfaces 8 of the links 7 that contact with the piston 2 and rings 1 are preferably curved so that they will the better fit the curved surfaces of the piston and rings. The links 7 are provided with outwardly and upwardly inclined upper end portions 9 whereby when the chain is placed around a piston, it will have a main body portion that engages the piston and a flaring or bell-mouthed portion.

The links 7 are pivotally secured to each other as by means of overlapping lug portions 10 through which extend pivot pins 11. The link 12 at one end of the chain is pivotally secured to the end of the clamping lever 4. Said link 12 is provided with a smooth side surface against which one of the links of the chain may abut when the chain is in use.

Each link 7 is provided with a projecting lug 6 that is provided with a surface that is adapted to be engaged by the end of the lever 5. When the chain is drawn loosely around a ring 1 of a piston, the clamping levers B may be spread apart and the end of the lever 5 brought into engagement with a clamping lug; and by drawing the clamping levers B together again the link 7 whose clamping lug 6 is engaged by the lever 5 is drawn towards the end link 12 that is secured to the lever, thus contracting the portion of the chain that encircles the piston ring, and contracting the piston ring until it is of the same over-all diameter as the piston and is compressed in its retaining groove.

It is noted that the handle portions 13 of the levers B are connected to the jaw portions by inclined portions 14, so that the handle portions and the jaw portions are in different planes, the pivot 15 passing through the handle portions. This construction permits the free end portion of the chain to pass between the jaw portions without engaging the pivot and the handle portions, thus not interfering with the operation of the clamping levers.

One method of using the device is as follows:

The chain A is drawn around the lowermost ring 1 of a piston 2 and the clamping levers B are drawn up tightly so that the ring is contracted in its retaining groove. The piston 2 is then inserted in the cylinder 3 and moved endwise into place until the chain A rests on the top of the cylinder. Then the piston is forced endwise further into the cylinder, the chain A holding the lowermost piston ring 1 in contracted position until it is inside of the cylinder 3 and held by the cylinder. Further endwise movement of the piston brings the next ring 1 of the piston 2 into the flaring portion of the chain A and said ring is contracted and held so that it may be inserted in the cylinder. The drawing shows a construction in which two piston rings are used; but obviously any number of piston rings may be used.

The herein described piston ring compressor has numerous advantages. It is simple and easy to operate; it need be set only once for each piston, regardless of the number of rings that are used; and it is adapted for use in connection with pistons of widely varying size.

Obviously numerous changes may be made without departing from the invention, and I do not wish to be limited to the precise construction shown.

What I claim is:

A device of the kind described, comprising a chain composed of solid links pivotally secured together to form a substantially continuous band and a pair of clamping levers, one end of said chain being secured to one of said clamping levers, and said links of said chain being provided with projecting lugs adapted to be engaged by said other clamping lever.

Signed at St. Louis, Missouri, this 29th day of August, 1924.

JULES L. FLORI.